(12) United States Patent
Su

(10) Patent No.: US 10,476,137 B1
(45) Date of Patent: Nov. 12, 2019

(54) TERMINAL HOUSING AND TERMINAL

(71) Applicant: Beijing Xiaomi Mobile Software Co., Ltd., Beijing (CN)

(72) Inventor: Jinhuai Su, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/384,924

(22) Filed: Apr. 16, 2019

(30) Foreign Application Priority Data

May 28, 2018 (CN) .......................... 2018 1 0525028

(51) Int. Cl.
*H01Q 1/24* (2006.01)
*H01Q 1/38* (2006.01)
*H01Q 1/48* (2006.01)
*H04M 1/02* (2006.01)

(52) U.S. Cl.
CPC .............. *H01Q 1/243* (2013.01); *H01Q 1/38* (2013.01); *H01Q 1/48* (2013.01); *H04M 1/0249* (2013.01)

(58) Field of Classification Search
CPC .......... H01Q 1/242; H01Q 1/243; H01Q 1/38; H01Q 1/48; H01Q 1/50; H01Q 1/52; H01Q 1/521; H01Q 1/523; H04M 1/0249
See application file for complete search history.

(56) References Cited

U.S. PATENT DOCUMENTS

| | | | |
|---|---|---|---|
| 10,271,299 B1* | 4/2019 | Sayem | H04W 64/00 |
| 2002/0033773 A1* | 3/2002 | Hirabayashi | G06F 1/1632 343/702 |
| 2004/0075613 A1* | 4/2004 | Jarmuszewski | H01Q 1/243 343/702 |
| 2006/0227058 A1* | 10/2006 | Zellweger | H01Q 1/273 343/718 |
| 2006/0238423 A1* | 10/2006 | Ozden | H01Q 1/243 343/702 |
| 2016/0064804 A1* | 3/2016 | Kim | H01Q 1/243 343/702 |
| 2017/0373388 A1* | 12/2017 | Wang | H01Q 1/44 |

* cited by examiner

*Primary Examiner* — Dinh Nguyen
(74) *Attorney, Agent, or Firm* — Arch & Lake LLP

(57) ABSTRACT

The present disclosure provides a terminal housing and a terminal. The main board unit in the terminal housing includes a power supply module, a switching module, a first grounding area, a second grounding area and a third grounding area; the antenna unit includes a horizontal bezel, a first branch, a second branch, a third branch and a fourth branch; the power supply module is connected to the horizontal bezel through the first branch; the first end of the switching module is connected to the contact area of the second branch, the third branch, and the fourth branch, the second end of the switching module is connected to the third grounding area, and the switching module is configured to control the first end to be connected to or disconnected from the second end.

20 Claims, 4 Drawing Sheets

US 10,476,137 B1

TERMINAL HOUSING AND TERMINAL

CROSS-REFERENCE TO RELATED APPLICATION

This application is based on and claims priority of Chinese Patent Application No. 201810525028.5, filed on May 28, 2018, which is incorporated herein by reference in its entirety for all purposes.

TECHNICAL FIELD

The present disclosure relates to the field of electronic technology, and more particularly to a terminal housing and a terminal.

BACKGROUND

An antenna is a component for transmitting and receiving signals on a terminal. The performance of the antenna directly affects the wireless communication performance of the terminal. Therefore, when designing the antenna, it is necessary to leave enough empty space for the antenna to avoid interference from other components and ensure the performance of the antenna.

SUMMARY

The present disclosure provides a terminal housing and a terminal. The present disclosure also provides a method of manufacturing a terminal.

According to a first aspect, there is provided a terminal housing. The terminal housing may include: a bottom metal bezel, a main board unit and an antenna unit, where the bottom metal bezel includes a segment of horizontal bezel divided by two slits; the main board unit includes a power supply module, a switching module, a first grounding area, a second grounding area and a third grounding area; the antenna unit includes the horizontal bezel, a first branch, a second branch, a third branch and a fourth branch; and the power supply module is connected to the horizontal bezel through the first branch.

In the terminal housing, the second branch and the third branch may be connected to the fourth branch, the second branch may be connected to the horizontal bezel, the third branch may be connected to the first grounding area, and the four branch may be connected to the second grounding area; and a first end of the switching module may be connected to the contact areas of the second branch, the third branch and the fourth branch, and a second end of the switching module may be connected to the third grounding area, and the switching module may be configured to control the first end to be connected to or disconnected from the second end.

According to a second aspect, there is provided a terminal. The terminal may include a terminal housing. The terminal housing of the terminal may include: a bottom metal bezel, a main board unit and an antenna unit, where the bottom metal bezel includes a segment of horizontal bezel divided by two slits; the main board unit includes a power supply module, a switching module, a first grounding area, a second grounding area and a third grounding area; the antenna unit includes the horizontal bezel, a first branch, a second branch, a third branch and a fourth branch; and the power supply module is connected to the horizontal bezel through the first branch.

In the terminal housing of the terminal, the second branch and the third branch may be connected to the fourth branch, the second branch may be connected to the horizontal bezel, the third branch may be connected to the first grounding area, and the four branch may be connected to the second grounding area; and a first end of the switching module may be connected to the contact areas of the second branch, the third branch and the fourth branch, and a second end of the switching module may be connected to the third grounding area, and the switching module may be configured to control the first end to be connected to or disconnected from the second end.

According to a third aspect, a method of manufacturing a terminal is provided. The method may include providing a terminal housing comprising a bottom metal bezel, a main board unit and an antenna unit; dividing a segment of horizontal bezel of the bottom metal bezel by two slits; providing the main board unit comprising a power supply module, a switching module, a first grounding area, a second grounding area and a third grounding area; providing the antenna unit comprising the horizontal bezel, a first branch, a second branch, a third branch and a fourth branch.

The method may also include connecting the power supply module to the horizontal bezel through the first branch; connecting the second branch and the third branch to the fourth branch, connecting the second branch to the horizontal bezel, connecting the third branch to the first grounding area, and connecting the four branch to the second grounding area; and connecting a first end of the switching module to the contact areas of the second branch, the third branch and the fourth branch, connecting a second end of the switching module to the third grounding area, and controlling the switching module to control the first end to be connected to or disconnected from the second end.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

DETAILED DESCRIPTION

The aspects of the present disclosure are described in detail below with reference to the accompanying drawings.

Reference is made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
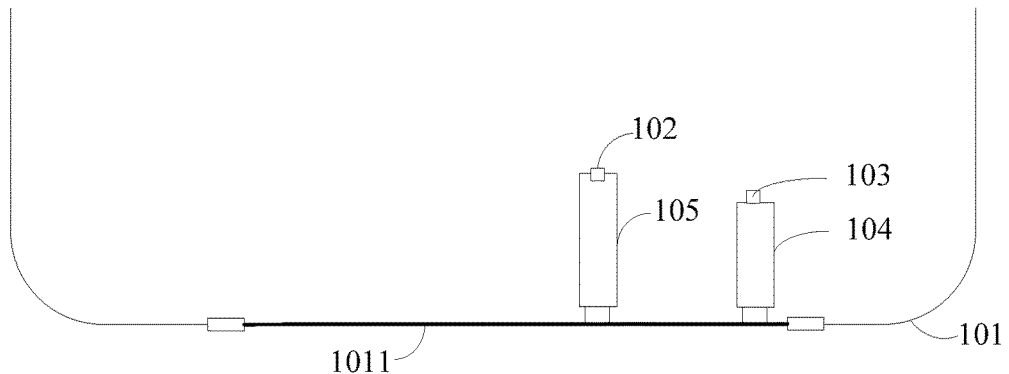
FIG. 1 is a schematic diagram of a back structure of a terminal housing according to an exemplary aspect.

A Planar Inverted F Antenna (PIFA) may be developed and the PIFA can utilize the metal bezel on the terminal housing as a partial antenna to reduce the occupation of the empty space. Referring to FIG. 1, the terminal housing includes a bottom metal bezel 101, a grounding area 102 and a power supply module 103. The bottom metal bezel 101 includes a segment of horizontal bezel 1011 divided by two slits; and the grounding area 102 and the power supply module 103 are disposed inside the terminal housing. The power supply module 103 is connected to the horizontal bezel 1011 through a first branch 104. The grounding area 102 is connected to the horizontal bezel 1011 through a second branch 105. The power supply module 103, the grounding area 102, the first branch 104, the second branch 105, and the horizontal bezel 1011 constitute a PIFA.

Figure 2:
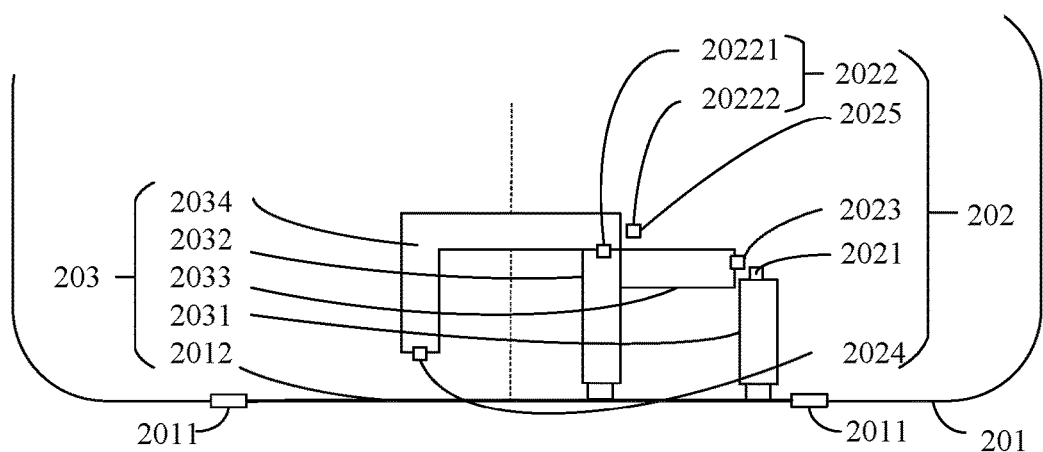
FIG. 2 is a schematic diagram of a back structure of a terminal housing according to an exemplary aspect.

FIG. 2 is a schematic diagram of a back structure of a terminal housing according to an exemplary aspect. Referring to FIG. 2, the terminal housing includes a bottom metal bezel 201, a main board unit 202 and an antenna unit 203.

In an aspect of the present disclosure, the terminal housing includes a plurality of bezels that collectively constitute border portions of the terminal housing. The bottom metal bezel 201 refers to a bezel disposed at the bottom of the terminal housing. The bottom metal bezel 201 is provided with two slits 2011, and includes a segment of horizontal bezel 2012 divided by the two slits 2011. The two slits 2011 may be through holes on the bottom metal bezel 201 or filled by non-conductive materials. The portion between the two slits 2011 is a horizontal bezel 2012, and the horizontal bezel 2012 and other portions of the bottom metal bezel 201 are separated by the two slits 2011.

In one implementation, the two slits 2011 are symmetric with respect to a perpendicular bisector axis of the bottom metal bezel 201.

In addition, the terminal housing may further include other metal bezels, such as two side metal bezels and a top metal bezel. The two side metal bezels are respectively connected to the bottom metal bezel and respectively connected to the top metal bezel to form a complete border bezel of the terminal housing. Moreover, in order to make the terminal housing more aesthetic, two symmetric slits may also be provided on the top metal bezel, and the two symmetric slits may be symmetric with the slits on the bottom metal bezel 2011.

In addition, the terminal housing may further include a non-metallic back cover, and the non-metallic back cover is connected to the bottom metal bezel 201. The non-metallic back cover may be a glass back cover or a back cover of other insulating materials. With non-metallic back cover, interference with the antenna unit 203 can be reduced, and the performance of the antenna unit 203 can be ensured as much as possible.

In the aspect of the present disclosure, the main board unit 202 includes a power supply module 2021, a switching module 2022, a first grounding area 2023, a second grounding area 2024 and a third grounding area 2025. The antenna unit 203 includes a horizontal bezel 2012, a first branch 2031, a second branch 2032, a third branch 2033 and a fourth branch 2034.

The power supply module 2021 is configured to supply power to the antenna unit 203, and the power supply module 2021 is connected to the horizontal bezel 2012 through the first branch 2031 to transmit electrical signals to the first branch 2031 and the horizontal bezel 2012. The first grounding area 2023, the second grounding area 2024 and the third grounding area 2025 are voltage reference points of the main board unit 202. The voltages of the three are all reference voltages, and the reference voltages may be 0 or a preset value.

The second branch 2032 and the third branch 2033 are connected to the fourth branch 2034, the second branch 2032 is connected to the horizontal bezel 2012, the third branch 2033 is connected to the first grounding area 2023, and the fourth branch 2034 is connected to the second grounding area 2024.

Then, the electrical signal output by the power supply module 2021 will be sent to the second branch 2032, the third branch 2033 and the fourth branch 2034 through the first branch 2031 and the horizontal bezel 2012, and reach the grounding area, in which process, the first branch 2031, the second branch 2032, the third branch 2033 and the fourth branch 2034 may radiate signals externally, thereby forming an antenna unit to implement signal reception and transmission.

The first branch 2031, the second branch 2032, the third branch 2033 and the fourth branch 2034 are all filled with a conductive material which may be a metal or other conductive material.

The first end 20221 of the switching module 2022 is connected to the contact area of the second branch 2032, the third branch 2033 and the fourth branch 2034. The second end 20222 of the switching module is connected to the third grounding area 2025, and the switching module 2022 is configured to control the first end 20221 to be connected to or disconnected from the second end 20222.

When the switching module 2022 controls the first end 20221 to be connected to the second end 20222, the contact area is connected to the third grounding area 2025, that is, the contact area is grounded, and the voltage is a reference voltage. When the switching module 2022 controls the first end 20221 to be disconnected from the second end 20222, the contact area is disconnected from the third grounding area 2025, that is, the contact area is not grounded.

Figure 3:
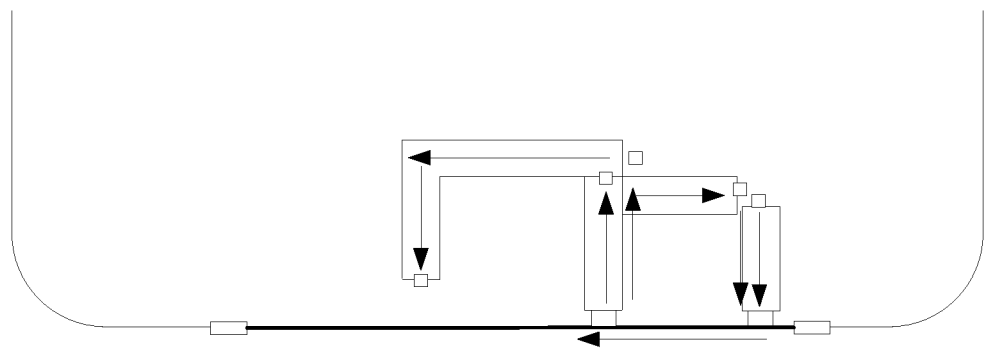
FIG. 3 is a schematic diagram of signal flow of an antenna unit according to an exemplary aspect.

In an implementation, when the switching module 2022 controls the first end 20221 to be connected to the second end 20222, the signal flow of the antenna unit 203 is as shown in FIG. 3. Referring to FIG. 3, the horizontal bezel 2012, the first branch 2031 and the second branch 2032 constitute a PIFA, the first branch 2031, the second branch 2032, the third branch 2033 and the fourth branch 2034 constitute a PIFA, and thus the antenna unit 203 has a dual PIFA architecture.

The radiation frequency band of the dual PIFA architecture is an IF frequency band, which may include the following frequency bands: Global System for Mobile Communication (GSM) 850 band, Global System for Mobile Communication (GSM) 900 band and 2000 mega megabit Hertz (MHz)-2170 megahertz (MHz) and the like. By contrast, the radiation frequency band of a conventional PIFA architecture is usually 2050 MHz-2150 MHz. Therefore, the radiation frequency band of the dual PIFA architecture is larger than the radiation frequency band of the conventional PIFA architecture, thereby improving the radiation frequency bandwidth of the antenna unit. In addition, in the dual PIFA architecture, since the first branch 2031 and the second branch 2032 are both applied to the two PIFAs, the strength of radiated signals can be improved, thereby enhancing the radiation efficiency of the antenna unit, compared to the conventional PIFA architecture. The radiation efficiency can be improved by 0-1 dB (decibel).

Figure 4:
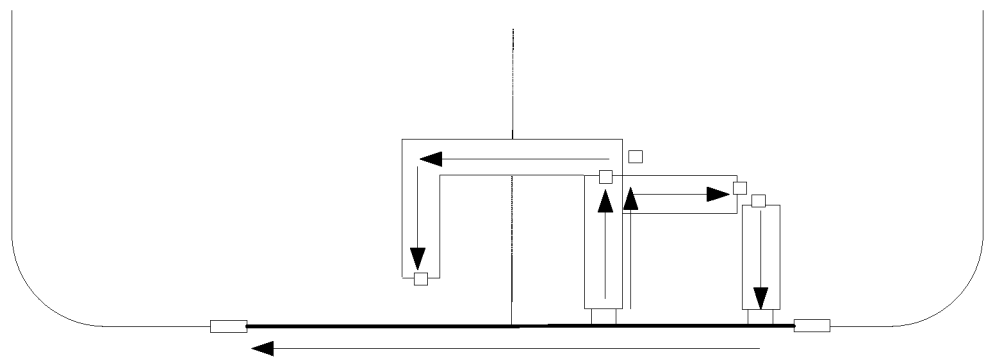
FIG. 4 is a schematic diagram of signal flow of an antenna unit according to an exemplary aspect.
Figure 5:
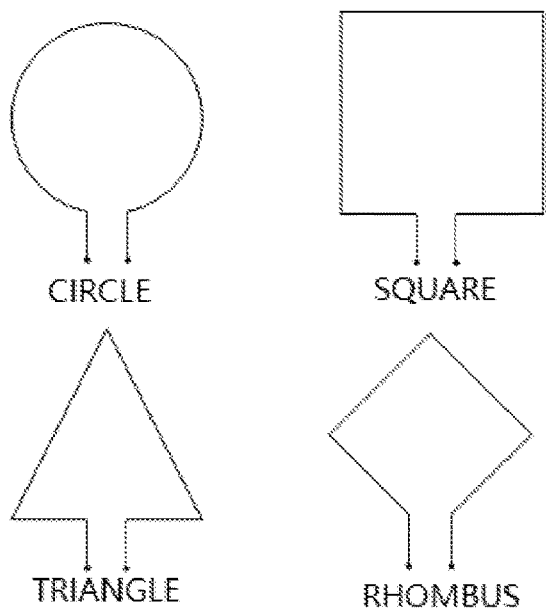
FIG. 5 is a schematic diagram of a basic form of a LOOP antenna, according to an exemplary aspect.

In another implementation, the fourth branch 2034 is a bent branch, and when the switching module 2022 controls the first end to be disconnected from the second end, the signal flow of the antenna unit 203 is as shown in FIG. 4. Referring to FIG. 4, the horizontal bezel 2012, the first branch 2031 and the second branch 2032 constitute a PIFA, the first branch 2031, the second branch 2032, the third branch 2033 and the horizontal bezel 2012 constitute a LOOP (loop) antenna, and the second branch 2032 and the fourth branch 2034 constitute another LOOP antenna, thus forming a PIFA composite dual LOOP architecture in the antenna unit 203. The basic form of the LOOP antenna is shown in FIG. 5. The arrangement of the antenna branches can be in any of the forms of FIG. 5.

The radiation frequency band of the PIFA composite dual LOOP architecture can cover the intermediate frequency band 1710 MHz-2000 MHz and the high frequency band 2300 MHz-2700 MHz, etc., which can effectively improve the radiation frequency bandwidth of the antenna unit. Moreover, due to the composite superposition between the various branches, the radiation signal efficiency of the antenna unit can be effectively improved, and can provide excellent 2G, 3G and 4G antenna performance.

It should be noted that the switching module 2022 can be controlled by the terminal. For example, the modem in the terminal can control the switching module 2022 to connect or disconnect the first end and the second end according to the radiation frequency band of the currently connected network, so that the current radiation frequency band of the antenna unit 203 matches the radiation frequency band of the connected network, to ensure normal communication of the antenna unit 203.

In sum, the terminal housing provided by the aspect of the present disclosure proposes a reconfigurable antenna design scheme, which utilizes the switching module to control the connection or disconnection between the first end and the second end, thereby switching the radiation frequency band of the antenna unit. Thus, the range of the radiation frequency band of the antenna unit can be enlarged, the radiation frequency bandwidth of the antenna unit can be increased, and the performance of the antenna unit can be improved. The antenna unit of the aspect of the present disclosure has excellent performance, the performance of the antenna unit can be ensured even in a limited empty space, and coverage of multiple frequency bands can be realized without interference from other components on the terminal, thereby ensuring communication performance of the terminal and improving the user experience in communication.

In addition, when the switching module controls the first end to be connected to the second end, a dual PIFA architecture is provided, which can radiate a wider intermediate frequency band through the composite superposition between the branches, thereby improving the radiation frequency bandwidth of the antenna unit and enhancing the radiation efficiency of the antenna unit.

Further, when the switching module controls the first end to be disconnected from the second end, the PIFA composite dual LOOP architecture is provided, which can cover the intermediate frequency band and the high frequency band, improve the radiation frequency bandwidth of the antenna unit, and enhance the radiation efficiency of the antenna unit.

Figure 6:
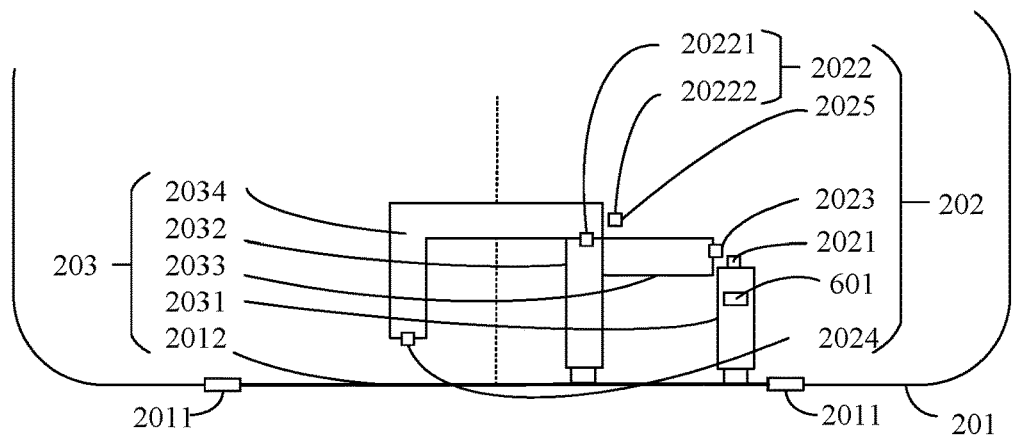
FIG. 6 is a schematic structural diagram of another terminal housing according to an exemplary aspect.

Based on the foregoing aspect, FIG. 6 is a schematic structural diagram of another terminal housing according to an exemplary aspect. Referring to FIG. 6, in addition to the structure shown in the foregoing aspect, the terminal housing further includes a variable capacitor. The first branch 2031 includes a first portion and a second portion, the power supply module 2021 is connected to the variable capacitor 601 through the first portion, and the variable capacitor 601 is connected to the horizontal bezel 2012 through the second portion.

The capacitance value of the variable capacitor 601 may vary, and the range of variation is that the capacitance value is not less than 1 pF (Picofarad) and not more than 10 pF. The variable capacitor 601 is configured to adjust the radiation frequency band of the antenna unit 203. When the capacitance value of the variable capacitor 601 changes, the radiation frequency band of the signal of the antenna unit 203 changes, thereby changing the radiation frequency bandwidth of the antenna unit 203.

For example, when the capacitance value of the variable capacitor 601 is 4.42 picofarads, the radiation frequency band of the antenna unit 203 is the GSM850 band; when the capacitance value of the variable capacitor 601 is 6.56 picofarads, the radiation frequency band of the antenna unit 203 is the GSM900 band; when the capacitance value of the capacitor 601 is 9.7 picofarads, the radiation frequency band of the antenna unit 203 is 2000 MHz to 2170 MHz.

Therefore, by adjusting the capacitance value of the variable capacitor 601, the electrical length of the radiated signal can be changed, and the three states of the antenna unit can be realized, respectively covering different intermediate frequency bands, having good radiation efficiency and providing excellent antenna performance.

It should be noted that the capacitance value of the variable capacitor 601 can be controlled by the terminal. For example, the modem in the terminal can control the switching module 2022 to connect or disconnect the first end and the second end according to the radiation frequency band of the currently connected network, so that the current radiation frequency band of the antenna unit 203 matches the radiation frequency band of the connected network, to ensure normal communication of the antenna unit 203.

Figure 7:
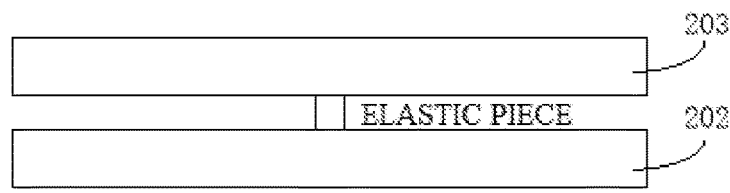
FIG. 7 is a side view of a terminal housing according to an exemplary aspect.

On the basis of the above aspects, FIG. 7 is a side view of a terminal housing according to an exemplary aspect. Referring to FIG. 7, the antenna unit 203 is disposed at the back of the main board unit 202, and each structure on the antenna unit 203 may be connected to a corresponding structure in the main board unit 202 through an elastic piece.

That is, the power supply module 2021 is connected to the first branch 2031 through an elastic piece, the third branch 2033 is connected to the first grounding area 2023 through an elastic piece; the fourth branch 2034 is connected to the second grounding area 2024 through an elastic piece; the first end 20221 is connected to the contact areas of the second branch 2032, the third branch 2033 and the fourth branch 2034 through elastic pieces; and the second end 20222 is connected to the third grounding area 2025 through an elastic piece.

The elastic piece is a conductive material, such as a metal or other conductive material.

In addition, the first branch 2031 may also be connected to the horizontal bezel 2012 through an elastic piece; the second branch 2032 may also be connected to the horizontal bezel 2012 through an elastic piece.

With the above structure, the antenna unit can be disposed in the empty space of the back of the main board unit 202, so that the empty space is not limited by the size of the display screen. Even when the full screen is employed, the reduction in size of the empty space, which reduction affects the performance of the antenna unit, is not necessary.

Figure 8:
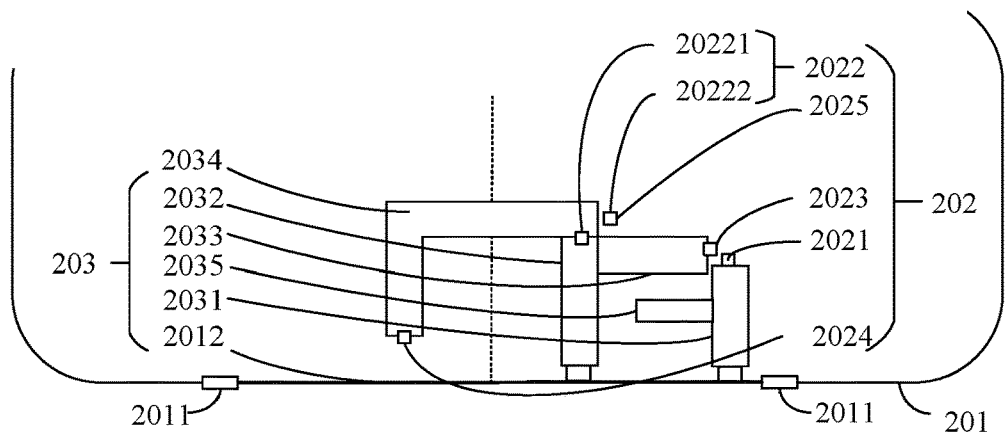
FIG. 8 is a schematic diagram of a back structure of a terminal housing according to an exemplary aspect.

On the basis of the above aspects, FIG. 8 is a schematic diagram of a back of a terminal housing according to an exemplary aspect. Referring to FIG. 8, the antenna unit 203 may further include a fifth branch 2035. The fifth branch 2035 is connected to the first branch 2031, and the fifth branch 2035 is a high frequency monopole that can radiate high frequency signals. The fifth branch 2035 may be filled with a conductive material, such as a metal or other conductive material.

The signal radiated by the high-frequency monopole can be superimposed with the signals radiated by other branches and horizontal bezels, and together with them, enhance the signal strength of the antenna signal and overcome the adverse effects of reduced bandwidth and reduced efficiency brought by other components.

An aspect of the present disclosure further provides a terminal. The terminal includes the terminal housing involved in the above aspects, and includes all the structures and functions of the terminal housing. However, the terminal may further include a front cover of the terminal, a display screen of the terminal, and other electronic components in the terminal, such as a speaker and a microphone. The antenna unit formed in the terminal housing cooperates with other electronic components in the terminal to implement the communication function of the terminal. The specific composition is not limited in the present disclosure.

Figure 9:
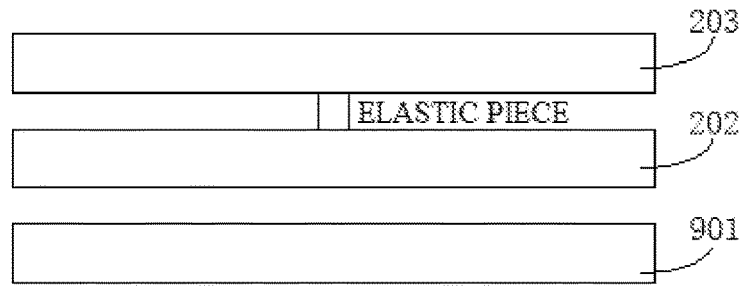
FIG. 9 is a side view of a terminal housing according to an exemplary aspect.

In an implementation, referring to FIG. 9, the terminal includes a display screen 901. The main board unit 202 is disposed at the back of the display screen 901, and the antenna unit 203 is disposed at the back of the main board unit 202.

Sometimes, the empty space is usually disposed under the display screen. In the aspect of the present disclosure, the empty space is disposed on the back of the display screen and the back of the main board unit, which not only can expand the size of the empty space, but also can ensure the performance of the antenna. Other components can be placed in the area below the display screen, such as expanding the size of the display screen and extending to the bottom metal bezel of the terminal, so as to realize a full screen.

The terminal housing provided by the present disclosure proposes a reconfigurable antenna design scheme, which utilizes the switching module to control the connection or disconnection between the first end and the second end, thereby switching the radiation frequency band of the antenna unit. Thus, the range of the radiation frequency band of the antenna unit can be enlarged, the radiation frequency bandwidth of the antenna unit can be increased, and the performance of the antenna unit can be improved. The antenna unit of the aspects of the present disclosure has excellent performance, the performance of the antenna unit can be ensured even in a limited empty space, and coverage of multiple frequency bands can be realized without interference from other components on the terminal, thereby ensuring communication performance of the terminal.

In addition, when the switching module controls the first end to be connected to the second end, a dual PIFA architecture is provided, which can radiate a wider intermediate frequency band through the composite superposition between the branches, thereby improving the radiation frequency bandwidth of the antenna unit and enhancing the radiation efficiency of the antenna unit.

Further, when the switching module controls the first end to be disconnected from the second end, the PIFA composite dual LOOP architecture is provided, which can cover the intermediate frequency band and the high frequency band, improve the radiation frequency bandwidth of the antenna unit, and enhance the radiation efficiency of the antenna unit.

The present disclosure may also provide a method of manufacturing a terminal. The method may include providing a terminal housing comprising a bottom metal bezel, a main board unit and an antenna unit; dividing a segment of horizontal bezel of the bottom metal bezel by two slits; providing the main board unit comprising a power supply module, a switching module, a first grounding area, a second grounding area and a third grounding area; providing the antenna unit comprising the horizontal bezel, a first branch, a second branch, a third branch and a fourth branch.

The method may also include connecting the power supply module to the horizontal bezel through the first branch; connecting the second branch and the third branch to the fourth branch, connecting the second branch to the horizontal bezel, connecting the third branch to the first grounding area, and connecting the four branch to the second grounding area; and connecting a first end of the switching module to the contact areas of the second branch, the third branch and the fourth branch, connecting a second end of the switching module to the third grounding area, and controlling the switching module to control the first end to be connected to or disconnected from the second end.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof.

What is claimed is:

1. A terminal housing, comprising:
a bottom metal bezel, a main board unit and an antenna unit, and wherein:
the bottom metal bezel comprises a segment of horizontal bezel divided by two slits;
the main board unit comprises a power supply module, a switching module, a first grounding area, a second grounding area and a third grounding area;
the antenna unit comprises the horizontal bezel, a first branch, a second branch, a third branch and a fourth branch;
the power supply module is connected to the horizontal bezel through the first branch;
the second branch and the third branch are connected to the fourth branch, the second branch is connected to the horizontal bezel, the third branch is connected to the first grounding area, and the four branch is connected to the second grounding area; and
a first end of the switching module is connected to the contact areas of the second branch, the third branch and the fourth branch, and a second end of the switching module is connected to the third grounding area, and the switching module is configured to control the first end to be connected to or disconnected from the second end.

2. The terminal housing according to claim 1, wherein, when the switching module controls the first end to be connected to the second end, the horizontal bezel, the first branch and the second branch form a planar inverted F antenna (PIFA); and
the first branch, the second branch, the third branch and the fourth branch form a second PIFA.

3. The terminal housing according to claim 1, wherein:
the fourth branch is a bent branch; and
when the switching module controls the first end to be disconnected from the second end, the horizontal bezel, the first branch and the second branch form a planar inverted F antenna (PIFA);
the first branch, the second branch, the third branch and the horizontal bezel form an annular LOOP antenna; and
the second branch and the fourth branch form another LOOP antenna.

4. The terminal housing according to claim 1, wherein the first branch comprises a first portion and a second portion, the power supply module is connected to a variable capacitor through the first portion, and the variable capacitor is connected to the horizontal bezel through the second portion.

5. The terminal housing according to claim 4, wherein the variable capacitor has a capacitance value of no less than 1 picofarad and no more than 10 picofarads, and the variable capacitor is configured to adjust a radiation frequency band of the antenna unit.

6. The terminal housing according to claim 1, wherein:
the antenna unit is disposed at a back of the main board unit;
the power supply module is connected to the first branch through an elastic piece, and the first branch is connected to the horizontal bezel through an elastic piece;
the second branch is connected to the horizontal bezel through an elastic piece;
the third branch is connected to the first grounding area through an elastic piece;
the fourth branch is connected to the second grounding area through an elastic piece;
the first end is connected to the contact areas of the second branch, the third branch and the fourth branch through elastic pieces; and
the second end is connected to the third grounding area through an elastic piece.

7. The terminal housing according to claim 1, wherein the antenna unit further comprises a fifth branch and the fifth branch is connected to the first branch, and the fifth branch is a high frequency monopole.

8. The terminal housing according to claim 1, wherein the two slits on the bottom metal bezel are symmetric with respect to a perpendicular bisector axis of the bottom metal bezel.

9. The terminal housing of claim 1, wherein the terminal housing further comprises a non-metallic back cover connected to the bottom metal bezel.

10. A terminal comprising a terminal housing having a bottom metal bezel, a main board unit and an antenna unit, and wherein:
the bottom metal bezel comprises a segment of horizontal bezel divided by two slits;
the main board unit comprises a power supply module, a switching module, a first grounding area, a second grounding area and a third grounding area;
the antenna unit comprises the horizontal bezel, a first branch, a second branch, a third branch and a fourth branch;
the power supply module is connected to the horizontal bezel through the first branch;
the second branch and the third branch are connected to the fourth branch, the second branch is connected to the horizontal bezel, the third branch is connected to the first grounding area, and the four branch is connected to the second grounding area; and
a first end of the switching module is connected to contact areas of the second branch, the third branch and the fourth branch, and a second end of the switching module is connected to the third grounding area, and the switching module is configured to control the first end to be connected to or disconnected from the second end.

11. The terminal according to claim 10, wherein, when the switching module controls the first end to be connected to the second end, the horizontal bezel, the first branch and the second branch form a planar inverted F antenna (PIFA); and
the first branch, the second branch, the third branch and the fourth branch form a second PIFA.

12. The terminal according to claim 10, wherein:
the fourth branch is a bent branch; and when the switching module controls the first end to be disconnected from the second end, the horizontal bezel, the first branch and the second branch form a planar inverted F antenna (PIFA);

the first branch, the second branch, the third branch and the horizontal bezel form an annular LOOP antenna; and the second branch and the fourth branch form another LOOP antenna.

13. The terminal according to claim 10, wherein the first branch comprises a first portion and a second portion, the power supply module is connected to a variable capacitor through the first portion, and the variable capacitor is connected to the horizontal bezel through the second portion.

14. The terminal according to claim 13, wherein the variable capacitor has a capacitance value of no less than 1 picofarad and no more than 10 picofarads, and the variable capacitor is configured to adjust a radiation frequency band of the antenna unit.

15. The terminal according to claim 10, wherein:
the antenna unit is disposed at a back of the main board unit;
the power supply module is connected to the first branch through an elastic piece, and the first branch is connected to the horizontal bezel through an elastic piece;
the second branch is connected to the horizontal bezel through an elastic piece;
the third branch is connected to the first grounding area through an elastic piece;
the fourth branch is connected to the second grounding area through an elastic piece;
the first end is connected to the contact areas of the second branch, the third branch and the fourth branch through elastic pieces; and
the second end is connected to the third grounding area through an elastic piece.

16. The terminal according to claim 10, wherein the antenna unit further comprises a fifth branch, the fifth branch is connected to the first branch, and the fifth branch is a high frequency monopole.

17. The terminal according to claim 10, wherein the two slits on the bottom metal bezel are symmetric with respect to a perpendicular bisector axis of the bottom metal bezel.

18. The terminal according to claim 10, wherein the terminal housing further comprises a non-metallic back cover connected to the bottom metal bezel.

19. A method of manufacturing a terminal comprising
providing a terminal housing comprising a bottom metal bezel, a main board unit and an antenna unit;
dividing a segment of horizontal bezel of the bottom metal bezel by two slits;
providing the main board unit comprising a power supply module, a switching module, a first grounding area, a second grounding area and a third grounding area;
providing the antenna unit comprising the horizontal bezel, a first branch, a second branch, a third branch and a fourth branch;
connecting the power supply module to the horizontal bezel through the first branch;
connecting the second branch and the third branch to the fourth branch, connecting the second branch to the horizontal bezel, connecting the third branch to the first grounding area, and connecting the four branch to the second grounding area; and
connecting a first end of the switching module to the contact areas of the second branch, the third branch and the fourth branch, connecting a second end of the switching module to the third grounding area, and controlling the switching module to control the first end to be connected to or disconnected from the second end.

20. The method according to claim 19, wherein, when controlling the switching module to control the first end to be connected to the second end, the horizontal bezel, the first branch and the second branch form a planar inverted F antenna (PIFA); and the first branch, the second branch, the third branch and the fourth branch form a second PIFA.

* * * * *